US012623965B2

(12) United States Patent
Volmer et al.

(10) Patent No.: US 12,623,965 B2
(45) Date of Patent: May 12, 2026

(54) CONCRETE ELEMENT AND METHOD FOR ITS PRODUCTION

(71) Applicant: METTEN Technologies Gmbh & Co. KG, Overath (DE)

(72) Inventors: Guido Volmer, Erwitte (DE); Michael Metten, Bergisch Gladbach (DE)

(73) Assignee: METTEN Technologies GmbH & Co. KG, Overath (DE)

( * ) Notice: Subject to any disclaimer, the term of this patent is extended or adjusted under 35 U.S.C. 154(b) by 888 days.

(21) Appl. No.: 17/642,437

(22) PCT Filed: Aug. 20, 2020

(86) PCT No.: PCT/EP2020/073347
§ 371 (c)(1),
(2) Date: Sep. 19, 2022

(87) PCT Pub. No.: WO2021/047875
PCT Pub. Date: Mar. 18, 2021

(65) Prior Publication Data
US 2023/0138864 A1 May 4, 2023

(30) Foreign Application Priority Data

Sep. 13, 2019 (DE) ..................... 10 2019 124 726.8

(51) Int. Cl.
| | |
|---|---|
| *C04B 28/08* | (2006.01) |
| *C04B 7/147* | (2006.01) |
| *C04B 7/52* | (2006.01) |
| *C04B 14/08* | (2006.01) |
| *C04B 14/28* | (2006.01) |
| *C04B 22/06* | (2006.01) |
| C04B 103/00 | (2006.01) |
| C04B 103/12 | (2006.01) |
| C04B 103/22 | (2006.01) |
| C04B 111/00 | (2006.01) |

(52) U.S. Cl.
CPC .............. *C04B 28/08* (2013.01); *C04B 7/147* (2013.01); *C04B 7/527* (2013.01); *C04B 14/28* (2013.01); *C04B 22/062* (2013.01); *C04B 2103/0088* (2013.01); *C04B 2103/12* (2013.01); *C04B 2103/22* (2013.01); *C04B 2111/00224* (2013.01); *C04B 2111/00612* (2013.01)

(58) Field of Classification Search
CPC ......... C04B 28/08; C04B 7/147; C04B 7/527; C04B 14/28; C04B 22/062; C04B 2103/0088; C04B 2103/12; C04B 2103/22; C04B 2111/00224; C04B 2111/00612; C04B 28/00; C04B 28/12; C04B 28/26; C04B 12/04; C04B 14/00; C04B 18/00; C04B 18/14; C04B 20/00; Y02P 40/10; Y02W 30/91; B28B 1/008; B28B 11/0818; B28B 13/022
See application file for complete search history.

(56) References Cited

U.S. PATENT DOCUMENTS

| | | | |
|---|---|---|---|
| 7,935,284 B2 | 5/2011 | Metten | |
| 8,460,459 B2 * | 6/2013 | Ellenrieder | ............. C04B 28/26 |
| | | | 106/789 |
| 8,709,151 B2 * | 4/2014 | Quaghebeur | ........... C04B 28/10 |
| | | | 106/713 |
| 9,242,898 B2 | 1/2016 | Beraldo et al. | |
| 9,296,652 B2 | 3/2016 | Krohm et al. | |
| 9,523,175 B2 | 12/2016 | Fritsche | |
| 9,649,783 B2 | 5/2017 | Barabas | |
| 10,815,150 B2 | 10/2020 | Metten | |

FOREIGN PATENT DOCUMENTS

| | | | | |
|---|---|---|---|---|
| CN | 101138859 A | 3/2008 | | |
| CN | 102325736 A | 1/2012 | | |
| CN | 107352865 B | 11/2019 | | |
| DE | 1471534 | 3/1969 | | |
| DE | 10331758 A1 | 2/2005 | | |
| DE | 102004062656 A1 | 7/2006 | | |
| DE | 102008033447 B3 | 11/2009 | | |
| DE | 102009045112 A1 | 3/2011 | | |
| DE | 102010029588 A1 | 12/2011 | | |
| DE | 102012105975 A1 | 1/2013 | | |
| DE | 102014010259 A1 | 1/2016 | | |
| DE | 202019102157 U1 | 6/2019 | | |
| DE | 102019124726 A1 | 3/2021 | | |
| EP | 1081114 A1 | 3/2001 | | |
| EP | 1236702 A1 | 9/2002 | | |
| EP | 2543649 A1 * | 1/2013 | ............. | C04B 28/02 |
| EP | 2597073 A1 | 5/2013 | | |
| EP | 2910354 A1 | 8/2015 | | |
| EP | 2812292 B1 | 1/2016 | | |
| ES | 2473345 T3 * | 7/2014 | ........... | C04B 14/047 |
| WO | 9726423 A1 | 7/1997 | | |
| WO | 2005049522 A1 | 6/2005 | | |
| WO | 2014067721 A1 | 5/2014 | | |

(Continued)

OTHER PUBLICATIONS

ASTM-E112-2010 (Year: 2010).*

(Continued)

*Primary Examiner* — Amber R Orlando
*Assistant Examiner* — Anastasia A. Kuvayskaya
(74) *Attorney, Agent, or Firm* — The Webb Law Firm

(57) ABSTRACT

What is shown and described is a concrete element including a core concrete layer and a face concrete layer, the face concrete layer being obtained by compacting and hardening a mixture containing a latent hydraulic binder and/or a pozzolanic binder, water, a granular material and an alkaline hardener, with the granular material having, at a screen hole width of 2 mm, a through fraction from 35.5 wt. % to 99.5 wt. % and, at a screen hole width of 0.25 mm, a through fraction from 2.5 wt. % to 33.5 wt. %, each based on the total weight of the granular material.

23 Claims, No Drawings

(56) References Cited

FOREIGN PATENT DOCUMENTS

| | | |
|---|---|---|
| WO | 2016005566 A1 | 1/2016 |
| WO | 2016030904 A1 | 3/2016 |
| WO | 2020084481 A1 | 4/2020 |

OTHER PUBLICATIONS

ES_2473345_T3_Machine_Translation (Year: 2014).*

EP_2543649_A1_Machine_Translation (Year: 2013).*

Zhang, "Alkaline Excited Slag Cement and Concrete," Southwest Jiatong University Press, 2018, pp. 85-87. Relevant for reasons cited in the Office Action.

Japanese Office Action dated Oct. 7, 2022, issued in corresponding Japanese Application No. 2022-546409, translation provided.

Verdichten, "Compacting", beton.wiki, Jul. 10, 2019, pp. 1-2, https://beton.wiki/index.php?title=Verdichten&oldid=11614.

Vollenschaar et al., "Wendehorst Baustoffkunde", ISBN: 9783663118299, Jul. 2013, 26th Edition, Vieweg +Teubner Verlag.

"Wendehorst Baustoffkunde", 2. Auflage 2011, ISBN 978-3-8351-0225-5.

Wetzei et al., "Packing density optimised face concretes for durable paving slabs", CPI—Concrete Plant International Apr. 2017.

Ambily et al., "Geopolymerbeton in der Betonwarenproduktion", BWI—Betonwerk International May 2013.

"Forschungsbericht F 7038", Fraunhofer IRB Verlag 2009 ISBN 978-3-8167-8147-9.

Kapitel 3 in M. Alexander und Sidney Mindness, "Aggregates in concrete", Taylor Francis, 2005.

Gutachterliche Stellungnahme des Herrn Dr. Karl-Uwe Voß vom 30. Apr. 2021.

"Kieselsäuren", Römpp, Georg Thieme Verlag KG, 2008.

Gutachterliche Stellungnahme des Herrn Dr. Karl-Uwe Voß vom 21. Mai 2024.

"Gesteinskörnungen für Normalbeton", Zement-Merkblatt Betontechnik, Informationszentrum Beton GmbH, Jan. 2012.

Vaz et al., Geopolymer Paver Blocks, Proc. of Int. Conf. on Advances in Civil Engineering, 2012.

"Alkali-silica reaction", Wikipedia, retrieved Jun. 3, 2025, pp. 1-22.

Geosil 14515 Alkaline activator based on potassium silicate Product Data Sheet, Oct. 2015.

* cited by examiner

CONCRETE ELEMENT AND METHOD FOR ITS PRODUCTION

CROSS-REFERENCE TO RELATED APPLICATIONS

This application is the United States national phase of International Application No. PCT/EP2020/073347 filed Aug. 20, 2020, and claims priority to German Patent Application No. 10 2019 124 726.8 filed Sep. 13, 2019, the disclosures of which are hereby incorporated by reference in their entirety.

BACKGROUND OF THE INVENTION

Field of the Invention

The invention relates to a concrete element comprising a core concrete layer and a face concrete layer, the face concrete layer being obtained by compacting and hardening a mixture containing a latent hydraulic binder and/or a pozzolanic binder, water, a granular material and an alkaline hardener. The invention also relates to a method for producing the concrete element according to the invention.

Description of Related Art

Concrete elements such as concrete blocks, concrete slabs, concrete wall elements or concrete steps are often used due to their durability and lower price compared to stones, plates or steps made of natural stone. Concrete elements are usually produced by using cement as a binder.

Various methods have been developed to enable the concrete elements to look decorative. For this purpose, among other things, pigment and/or natural stone aggregates and/or sands are usually added to provide color to the concrete element.

Cement-containing concrete elements sometimes have the problem that they develop whitish spots on the surface over time. The color of colored concrete blocks may also fade. Both effects appear to be caused by the formation of lime. The whitish spots on the surface are attributed to lime efflorescence, which is formed by the reaction of calcium hydroxide transported to the surface with carbon dioxide. It is believed that the color fading is caused, among other things, by the fact that the pigment that has settled on the cement particles to provide color is slowly coated with calcium carbonate that forms. This is how the color impression of the pigment is slowly lost.

Binders that are an alternative to cement are known. An example of such alternative binders is based on the chemical building blocks $SiO_2$ in combination with $Al_2O_3$. Examples of such binders are latent hydraulic binders and pozzolanic binders. These are often referred to as "geopolymers." EP 1 236 702 A1 describes for example a building material mixture containing water glass and a latent hydraulic binder. EP 1 236 702 A1 proposes to use the building material mixture as a mortar or filler.

EP 1 081 114 A1 also describes a building material mixture for the production of chemical-resistant mortars, wherein the building material mixture contains water glass powder, at least one soluble water glass hardener, an inorganic filler and at least 10 wt. % of a latent hydraulic binder.

WO 2014/067721 A1 discloses an aluminosilicate binder which is activated by alkaline substances. According to WO 2014/067721 A1, the aluminosilicate binder is suitable for fresh concrete, concrete parts, sprayed concrete, building adhesives and other applications.

The production of concrete elements such as concrete blocks, concrete slabs, concrete wall elements or concrete steps places special demands on the concrete mix used, especially when compared to fresh concrete. When producing concrete elements, it is desirable to achieve the highest possible stability of the not yet hardened concrete blocks after as little time as possible so that they can be packed as quickly as possible. An additional requirement for the products that comprise a face concrete layer and core concrete is a high bond strength in order to prevent the face concrete layer from delaminating from the core under load. The adhesive tensile strength can be used to measure the resistance of the face concrete layer against a delamination from the core concrete of the concrete elements.

If the adhesive tensile strength of the concrete elements is not high enough, the face concrete layer and core concrete can separate under load (delamination) or tear apart when the formwork is removed. This means that the concrete elements can be produced with a shorter cycle time and therefore more economically if they are designed with a sufficiently high adhesive tensile strength.

In the course of the development of the present invention, it was found that concrete elements or layers of concrete elements which contain latent hydraulic binders and/or pozzolanic binders have a lower adhesive tensile strength under otherwise comparable production conditions and components than concrete elements which contain cement as a binder.

SUMMARY OF THE INVENTION

The object of the invention was therefore to provide aesthetically sophisticated concrete elements that change their appearance less over time and can be produced economically. In particular, concrete blocks are to be provided which show less staining and/or soiling on the surface and/or less color fading and/or have a sufficiently high adhesive tensile strength. Another object of the invention is to provide concrete elements with a reduced $CO_2$ footprint.

Further tasks, some of which are listed below, result from the following explanations.

The invention solves all or some of these tasks with the concrete element as described herein and the method as described herein.

Advantageous embodiments of the invention are specified in the dependent claims and are explained in detail below.

DESCRIPTION OF THE INVENTION

The invention provides a concrete element comprising a core concrete layer and a face concrete layer, the face concrete layer being obtained by compacting and hardening a mixture containing a latent hydraulic binder and/or a pozzolanic binder, water, a granular material and an alkaline hardener, with the granular material having, at a screen hole width of 2 mm, a through fraction from 35.5 wt. % to 99.5 wt. % and, at a screen hole width of 0.25 mm, a through fraction from 2.5 wt. % to 33.5 wt. %, each based on the total weight of the granular material.

Surprisingly, it was found that concrete elements comprising a core concrete layer and a face concrete layer, the face concrete layer being obtained by compacting and hardening a mixture containing a latent hydraulic binder and/or a pozzolanic binder, water, a granular material and an alkaline hardener, with the granular material having, at a screen hole width of 2 mm, a through fraction from 35.5 wt. % to 99.5 wt. % and, at a screen hole width of 0.25 mm, a through fraction from 2.5 wt. % to 33.5 wt. %, each based on the total weight of the granular material, change their decorative properties very slowly, if at all and can be produced in a cost-effective manner. The aforementioned concrete elements have, in particular, a sufficiently high adhesive tensile strength. This makes it possible to remove them from the mold quickly without tearing the unhardened concrete blocks apart. Furthermore, these concrete blocks show at most a slow fading of the colors and little or no staining on the surface.

Without wishing to be bound by any particular scientific theory, this seems to be due to the fact that the presence of the latent hydraulic binder and/or pozzolanic binder means that the concrete blocks do not lose their decorative properties or may do so only slowly. This seems to be caused by the fact that the concrete elements according to the invention contain less CaO than the concrete elements which usually contain a lot of cement. It has also been found that by using a granular material which, at a screen hole width of 2 mm, has a through fraction from 35.5 wt. % to 99.5 wt. % and, at a screen hole width of 0.25 mm, has a through fraction from 2.5 wt. % to 33.5 wt. %, a good adhesive tensile strength can be achieved when latent hydraulic binders and/or pozzolanic binders are used. It was possible to produce concrete elements with granular material having larger diameters, but their adhesive tensile strength was not as good. Without wishing to be bound by any scientific theory, the improved adhesive tensile strength could be due to the fact that the components of the granular material with rather smaller diameters have a smaller mean distance from one another. This means that shorter chains of latent hydraulic binder and/or pozzolanic binder can link the components of the granular material to one another, thereby improving the mechanical properties and in particular the adhesive tensile strength of concrete elements that have not yet hardened.

The granular material can also be referred to as aggregate.

The not yet hardened concrete elements can also be referred to as green concrete elements.

The adhesive tensile strength can be determined on concrete blocks with a certain testing age, for example 56 days. Concrete elements according to the invention preferably have an adhesive tensile strength of 1 MPa and more.

Preferably, the granular material has, at a screen hole width of 2 mm, a through fraction from 42.5 wt. % to 99.5 wt. %, more preferably from 56.5 wt. % to 98.5 wt. %, particularly preferably from 72.5 wt. % to 97.5 wt. %, and, at a screen hole width of 0.25 mm, a through fraction from 2.5 wt. % to 27.5 wt. %, more preferably from 2.5 wt. % to 22.5 wt. %, even more preferably from 2.5 wt. % to 21.5 wt. %, particularly preferably from 2.5 wt. % to 8 wt. % or from 11.5% to 21.5 wt. % based on the total weight of the granular material. It has been found that granular material with the above-mentioned through fractions at the mentioned screen hole widths can result in concrete elements with good adhesive tensile strength.

The above-mentioned through fractions for the two screen hole widths can be combined with one another as desired.

The granular material can also have a grain size number from 1.59 to 3.62, preferably from 1.61 to 3.17, particularly preferably from 1.61 to 2.55.

The granular material preferably has a graded grain composition. A graded grain composition in particular comprises components with different grain sizes.

The granular material can be contained in the mixture at different amounts. The mixture preferably contains 55 wt. % to 80 wt. %, preferably 60 wt. % to 75 wt. %, more preferably 60 wt. % to 72 wt. %, of the granular material based on the total weight of the mixture. The mixture can particularly preferably contain 60 wt. % to 65 wt. %, in particular 60 wt. % to 64 wt. %, of the granular material, based on the total weight of the mixture. The mixture can particularly preferably also contain 67 wt. % to 72 wt. % of the granular material, based on the total weight of the mixture.

In addition to the components mentioned above, the mixture can also contain other components, for example a filler. The mixture preferably contains 1 wt. % to 30 wt. %, preferably 1 wt. % to 20 wt. %, more preferably 5 wt. % to 18 wt. %, even more preferably 5 wt. % to 15 wt. %, even more preferably 5 wt. % to 10 wt. %, and particularly preferably 6 wt. % to 8 wt. % of a filler, based on the total weight of the mixture.

The filler preferably has, at a screen hole width of 0.025 mm, a through fraction from 63 wt. % to 99 wt. %, preferably from 68 wt. % to 99 wt. %, more preferably from 90 wt. % to 99 wt. %, particularly preferably from 95 wt. % to 99 wt. %, and, at a screen hole width of 0.015 mm, a through fraction from 38 wt. % to 73 wt. %, preferably from 58 wt. % to 67 wt. %, particularly preferably from 61 wt. % to 66 wt. %, based on the total weight of the filler. Good results are also obtained if the filler has, at a screen hole width of 0.025 mm, a through fraction from 68 wt. % to 77 wt. %, and, at a screen hole width of 0.015 mm, a through fraction from 38 wt. % to 47 wt. %, based on the total weight of the filler.

The above-mentioned through fractions for the two screen hole widths can be combined with one another as desired.

It has been found that the use of a filler with the through fractions at the screen hole widths listed above can further improve the adhesive tensile strength, in particular the strength of not yet hardened concrete elements. Optimal results can be achieved with regard to the adhesive tensile strength, in particular through the combined use of a granular material and a filler with the above-mentioned through fractions at the aforementioned screen hole widths. As a result, the mixture can also be adjusted so that the decorative properties of the concrete element change very little or not at all.

Different materials can be used as fillers. The filler is preferably selected from the group consisting of fly ash, slag sand, rock powder, preferably classified rock powder, limestone powder, preferably classified limestone powder and mixtures thereof. The filler is more preferably fly ash or slag sand.

It is possible to economically produce decorative concrete elements with the fillers mentioned above, whose decorative properties do not fade or only fade slowly.

Latent hydraulic binders and/or pozzolanic binders can be contained in the mixture in different amounts. The mixture preferably contains 15 wt. % to 40 wt. %, preferably 20 wt. % to 30 wt. %, more preferably 20 wt. % to 24 wt. %, particularly preferably 22 wt. % to 24 wt. % of latent hydraulic binder and/or pozzolanic binder, based on the total weight of the mixture. Good results are also obtained if the mixture contains 26 wt. % to 29 wt. % of the latent hydraulic binder and/or pozzolanic binder, based on the total weight of the mixture.

Accordingly, the mixture can also contain only 15 wt. % to 40 wt. %, preferably 20 wt. % to 30 wt. %, more preferably 20 wt. % to 24 wt. % or 26 wt. % up to 29 wt. %,

5

6 particularly preferably 22 wt. % to 24 wt. % latent hydraulic binders and no pozzolanic binder, based on the total weight of the mixture. The mixture can also contain only 15 wt. % to 40 wt. %, preferably 20 wt. % to 30 wt. %, more preferably 20 wt. % to 24 wt. % or 26 wt. % to 29 wt. %, particularly preferably 22 wt. % to 24 wt. % pozzolanic binders and no latent hydraulic binders, based on the total weight of the mixture.

It has been found that the resulting concrete elements do not have sufficient strength when using less than 15 wt. % of a latent hydraulic binder and/or pozzolanic binder. In contrast, the use of more than 40 wt. % of a latent hydraulic binder and/or pozzolanic binder is uneconomical.

Different materials can be used as latent hydraulic binders. The molar ratio of $(CaO+MgO):SiO_2$ in the latent hydraulic binder is preferably from 0.8 to 2.5, more preferably from 1.0 to 2.0. Latent hydraulic binders with a molar ratio of $(CaO+MgO):SiO_2$ in the aforementioned range harden well.

The latent hydraulic binder is advantageously selected from the group consisting of slag, blast furnace slag, preferably slag sand, in particular ground slag sand, electrothermal phosphorus slag, steel slag and mixtures thereof. The latent hydraulic binder is more preferably slag sand, in particular ground slag sand.

Slag can either be industrial slag, i.e., waste products from industrial processes, or synthetically produced slag. The latter is preferred because industrial slag is not always available in constant quantities and grades. Blast furnace slag, especially slag sand, is an example of slag.

Ground slag sand varies in terms of fineness and particle size distribution depending on its origin and the type of treatment. The fineness has an influence on the reactivity. The Blaine value in particular can be used as a measure of the fineness. The ground slag sand preferably has a Blaine value of 200 to 1000 $m^2$ $kg^{-1}$, more preferably 450 to 650 $m^2$ $kg^{-1}$.

Electrothermal phosphorus slag is a waste product from the electrothermal phosphorus production. Electrothermal phosphorus slag is less reactive than blast furnace slag and contains approximately 45 to 50 wt. % CaO, approximately 0.5 to 3 wt. % MgO, approximately 38 to 43 wt. % $SiO_2$, approximately 2 to 5 wt. % $Al_2O_3$ and approximately 0.2 to 3 wt. % $Fe_2O_3$ as well as fluorides and phosphates.

Steel slag is a waste product from steel production and can vary considerably in its composition.

Particularly preferably, the molar ratio of $(CaO+MgO):SiO_2$ in the latent hydraulic binder is from 0.8 to 2.5 and the latent hydraulic binder is selected from the abovementioned materials.

Different materials can be considered as pozzolanic binders. The pozzolanic binder is preferably selected from the group consisting of amorphous silicon dioxide, precipitated silicon dioxide, pyrogenic silicon dioxide, microsilica, glass powder, fly ash such as lignite fly ash or hard coal fly ash, metakaolin, natural pozzolans such as tuff, trass or volcanic ash, natural and synthetic zeolites and mixtures thereof. In particular, the pozzolanic binder is preferably amorphous silicon dioxide.

The amorphous silicon dioxide preferably shows no crystallinity in a powder diffractogram. Glass powder is preferably also considered amorphous silicon dioxide. The amorphous silicon dioxide advantageously has a $SiO_2$ content of at least 80 wt. %, preferably at least 90 wt. %. Preferably, precipitated silicon dioxide is obtained industrially by precipitating water glass. Depending on the type of production, precipitated silicon dioxide can also be referred to as silica gel. Pyrogenic silicon dioxide is produced by reacting chlorosilanes such as silicon tetrachloride in an oxyhydrogen flame. Pyrogenic silicon dioxide is amorphous $SiO_2$ powder with a particle diameter of 5 to 50 nm and a specific surface area of 50 to 600 $m^2$ $g^{-1}$.

Microsilica is a byproduct of the silicon or ferrosilicon production and contains large amounts of amorphous $SiO_2$ powder. The particles have a diameter of approximately 0.1 nm. The specific surface ranges from 15 to 30 $m^2$ $g^{-1}$.

Fly ash is formed during combustion in coal-fired power plants, for example. According to WO 2008/012438 A2, fly ash of the F class contains less than 8 wt. %, preferably less than 5 wt. % of CaO.

Metakaolin is formed by dehydrating kaolin. While kaolin releases physically bound water in temperatures ranging from 100 to 200° C., the breakdown of the lattice structure and the formation of metakaolin ($Al_2Si_2O_7$) occurs in a range of 500 to 800° C. Pure metakaolin preferably contains approximately 54 wt. % of $SiO_2$ and approximately 46 wt. % of $Al_2O_3$.

It has been found that the aforementioned latent hydraulic and pozzolanic binders can be used to produce concrete elements whose decorative properties do not fade or only fade very slowly.

Different materials can be used as an alkaline hardener. The alkaline hardener is preferably selected from the group consisting of alkali metal oxides, alkali metal hydroxides, alkali metal carbonates, alkali metal silicates, alkali metal aluminates and mixtures thereof. The alkaline hardener is more preferably selected from the group consisting of alkali metal hydroxides, alkali metal silicates and mixtures thereof.

Examples of alkali metal oxides are $Li_2O$, $Na_2O$, $K_2O$, $(NH_4)_2O$ and mixtures thereof. Examples of alkali metal hydroxides are LiOH, NaOH, KOH, $NH_4OH$ and mixtures thereof. Examples of alkali metal carbonates are $Li_2CO_3$, $Na_2CO_3$, $K_2CO_3$, $(NH_4)_2CO_3$ and mixtures thereof. Because of its similarity to the alkali metal ions, ammonium ion is listed as well.

Alkali metal silicates are expediently selected from compounds with the empirical formula m $SiO_2 \cdot n$ $M_2O$, where M is Li, Na, K or $NH_4$ or a mixture thereof, preferably Na or K. The molar ratio of m:n ranges from 0.5 to 3.6, preferably from 0.6 to 3.0, particularly preferably from 0.7 to 2.0. Water glass, in particular liquid water glass, more preferably liquid sodium and/or potassium silicate, has proven to be a particularly useful alkali metal silicate. Silicic acid, in particular aqueous silicic acid, is another useful alkali metal silicate.

The aforementioned alkaline hardeners are preferably used as an aqueous solution. This makes metering easier.

The hardening of the concrete elements according to the invention, in particular the face concrete layer, can be easily adjusted with the aforementioned alkaline hardeners. Furthermore, these alkaline hardeners show a good compatibility with the other components in the mixture.

The alkaline hardener can be contained in the mixture in different amounts. The mixture preferably contains 3 wt. % to 5 wt. %, preferably 3.15 wt. % to 4.85 wt. %, more preferably 4.0 wt. % to 4.75 wt. %, even more preferably 4.25 wt. % to 4.75 wt. %, particularly preferably 4.35 wt. % to 4.55 wt. % of the alkaline hardener, based on the total weight of the mixture. Good results are also obtained if the mixture contains 3.25 wt. % to 3.65 wt. % of the alkaline hardener, based on the total weight of the mixture. It was found that the concrete elements, in particular the face concrete layer, hardened too slowly when less than 3 wt. % of the alkaline hardener was used. If more than 5 wt. % of alkaline hardener is used, the hardening can start too quickly, so that the resulting concrete element, in particular the face concrete layer, can no longer be compacted properly.

According to the invention, the mixture contains water. The mixture preferably contains 3 wt. % to 7 wt. %, preferably 3.5 wt. % to 6.5 wt. %, more preferably 4.0 wt. % to 6.2 wt. %, even more preferably 4.2 wt. % to 4.9 wt. %, particularly preferably 4.2 wt. % to 4.8 wt. % water, based on the total weight of the mixture. Good results are also obtained if the mixture contains 5.2 wt. % to 6.2 wt. % of water, based on the total weight of the mixture.

The mixture may also contain other components in addition to the components binder, water, granular material and alkaline hardener. The mixture may, for example also contain one or more additives such as gravel, grit, sand, perlite, kieselguhr or vermiculite. The mixture preferably contains cement and/or one or more additives such as gravel, grit, sand, perlite, kieselguhr or vermiculite, and/or one or more additives selected from the group consisting of plasticizers, antifoam agents, water retention agents, dispersants, pigments, fibers, redispersible powders, wetting agents, impregnating agents, complexing agents and rheology additives.

Alternatively, the mixture is preferably free of cement. As a result, in particular, concrete elements can be produced which have an advantageous carbon dioxide footprint.

The mixture advantageously contains hardening regulators. In particular, setting retarders and/or setting accelerators may be considered as hardening regulators.

The properties of the mixture can be controlled well with the abovementioned additives. In particular, the hardening behavior can be controlled well with the aforementioned additives.

The mixture preferably contains 0.1 wt. % to 2 wt. %, more preferably 0.4 wt. % to 1.5 wt. %, additives, based on the total weight of the mixture. The mixture expediently contains 0.025 wt. % to 0.097 wt. % or 1.5 wt. % to 2 wt. % setting retarders and/or setting accelerators.

The concrete element according to the invention preferably has a compaction class according to the DIN 1045-2 C0 or C01 standard. The concrete element is preferably a concrete block, a concrete slab, a concrete wall element or a concrete step.

The invention also provides a method for producing concrete elements according to the invention, comprising the following steps:
   a. Preparing of a composition containing as components
       i. granular material,
       ii. optional pigment,
       iii. optional filler,
       iv. water,
       v. latent hydraulic binder and/or pozzolanic binder, and
       vi. alkaline hardener,
   b. Mixing of the composition to obtain a mixture
   c. Filling of the mixture into at least one mold,
   d. Compacting of the mixture to obtain at least one green concrete element.

The mixture is preferably compressed in at least one mold. The compression can take place by means of stamping and/or vibration.

The method steps are preferably carried out in the order specified above.

Furthermore, the components of the composition are advantageously metered in the order given. It has been found that when the components are added in the order given above, the mixture is easy to process. It has also proven to be expedient if the components of the composition are already mixed during metering.

What was said above with regard to the concrete element according to the invention about the granular material, the filler, the water, the latent hydraulic binder and/or the pozzolanic binder and the alkaline hardener, applies accordingly, in particular also with regard to the amounts of the components used.

Furthermore, the composition may also contain the additional components listed above, such as aggregates, additives, setting retarders and/or setting accelerators. Aggregates, additives, setting retarders and/or setting accelerators are advantageously metered in with the water or the optional pigment, preferably with the water.

Using the method according to the invention, it is possible to design the surface of the concrete elements. According to one embodiment, a portion of a grained material containing (a) a litter component with a mean grain diameter of 0.1 to 5 mm in an amount of 65 to 95 wt. %, preferably 75 to 85 wt. %, and (b) a binder in an amount of 5 to 35 wt. %, preferably 15 to 25 wt. %, based on the total composition of the grained material, is applied to the mixture before compacting of the mixture in the at least one mold.

By using the litter component and the binder in these concentration ranges, the grained material can be well anchored on the surface of the concrete element.

The mean grain diameter is understood by those skilled in the art to refer to the diameter in which there is the same number of grains with a larger and a smaller diameter. The mean grain diameter can be determined, for example, by sieving.

In order to produce especially aesthetically appealing concrete elements in accordance with this embodiment of the method according to the invention, it has proven advantageous if the face concrete layer has an optical property such as color or degree of gloss and the grained material has an optical property which deviates therefrom. This makes it possible, for example, to create flamed, veined or speckled surfaces that look similar to the natural structure of natural stones.

According to this embodiment, the grained material is preferably applied to the mixture by means of an application device. The application device can have at least one trickling device, a centrifugal disc, a paddle wheel, a limb and/or a catapult, to which at least a portion of the grained material is fed. These devices can move over the mold or next to the mold, and they can also be fed different portions at different intervals. This way, the grained material can be applied evenly to the mixture. It has also been found that the method according to the invention can be carried out particularly economically in this way.

The application device advantageously has at least one metering container containing the grained material and a metering strip, with the metering container being guided over the mold at a uniform or non-uniform speed.

Preferably, vibrations or vibratory shocks, which are carried out uniformly and/or irregularly and/or intermittently, are exerted on the metering strip.

Different finishing materials and/or different portions of finishing material can preferably be supplied to the metering strip along its extension.

Furthermore, it has also proven advantageous if the metering container is attached to the front edge of the metering carriage for the concrete, preferably the face concrete.

Possible configurations of an application device with at least one metering container with a metering strip are described for example in EP 2 910 354 A1. An example of an application device with at least one metering container with a metering strip is a filling carriage with at least one chamber. The grained material may be contained in this chamber. The filling carriage may also have two or more chambers separated by a partition. In that case, the mixture according to the invention is advantageously contained in a first chamber of the filling carriage. The grained material is preferably contained in a second chamber. Additional chambers may contain other grained materials with different properties, for example a different color. The filling carriage may be moved over a mold along a guide rail.

The chamber with the grained material may have an application element. The application element can be removed from the chamber. The chamber can have one or more application elements.

The application element preferably has a perforated metering plate with at least one, preferably several holes and a metering element. The holes can be arranged uniformly in the metering plate or in a pattern. The holes can have the same or different diameters. The metering plate can be flat or curved. The metering plate can also be cylindrical. The metering plate can in particular form the metering strip.

The metering element can be designed differently. The metering element can, for example, comprise a shaft, to which blades are attached, which can be rotated about the longitudinal axis of the shaft. The grained material is preferably located in the spaces formed by two blades of the shaft and the associated section of the metering plate. By rotating the shaft about its longitudinal axis, the blades push the grained material through the holes in the metering plate, thereby applying it to the mixture. Such a metering element is preferably used in conjunction with a curved metering plate.

The metering element can also be designed like a comb. In that case, the comb-like metering element preferably rests movably on a flat metering plate. The grained material is preferably located between the teeth of the comb on the metering plate. By moving the comb on the metering plate, the grained material is pressed through the holes of the metering plate and is thus applied to the mixture.

The metering element can also be a perforated plate. The perforated plate preferably rests on a flat metering plate. The grained material is preferably located in the holes of the perforated plate on the metering plate. By moving the perforated plate on the metering plate, the grained material is pressed through the holes of the metering plate and is thus applied to the mixture.

Finally, the metering element can also be a freely movable element, which is preferably arranged inside a cylindrical metering plate. The grained material is preferably also arranged inside the cylindrical metering plate. The freely movable element is, due to its weight, able to press the grained material through the holes of the metering plate. By moving, in particular rotating, the cylindrical metering plate, the grained material is pressed through the holes of the metering plate and thus applied to the mixture.

The application element advantageously also comprises further components such as an actuator with which the metering element can be moved. The actuator can be connected to an electric motor, which can preferably be controlled by electronic control means. The application element can also have an actuator rod, a cam follower, which is in engagement with a cam, and/or a gear.

According to a preferred embodiment of the method according to the invention, the application device comprises at least one pipe socket, to which one or more portions of a grained material are fed and through which these are scattered, thrown, shot and/or dropped onto the face concrete layer. A particularly good distribution across the mold occurs if the end of the pipe socket is designed in the manner of a nozzle.

Practical tests have shown the method according to the invention results in a good distribution, if the ejection takes place by means of a prestressed, spring-loaded piston, whose lock is suddenly released so that the material can be thrown.

The application device can preferably be moved above the mold and/or next to the mold. It can have or achieve different speeds of movement, with jerky movements being advantageous as well. Depending on the size of the mold and the color of the grained material in the application device, several and also different devices can be used for one mold, in order to achieve a more uniform application or a special characteristic application pattern of the grained material.

Baffle plates are preferably used in the application devices, since such disc wheels or limbs and also pipe sockets can have a wider scattering.

Several portions of the grained material can, one after the other, be ejected by the application devices, which may be different grained materials, as described above.

The binder contained in the grained material is preferably an inorganic binder such as cement, hydraulic lime, gypsum or water glass, or the binder contained in the grained material is an organic binder such as plastic dispersions, acrylate resins, alkyd resins, epoxy resins, polyurethanes, SolGel resins or silicone resin emulsions. Such binders are particularly easy to handle in connection with concrete elements. In addition, they make no additional demands on the method. Furthermore, such binders enable the grained material to be well anchored on the concrete element.

Depending on the desired visual look of the concrete element, litter components with different mean grain diameters can be used. A litter component with a mean grain diameter of 0.1 to 1.8 mm can be used as the litter component. Alternatively, a litter component with a mean grain diameter of 1.2 to 5 mm can be used.

A litter component with a mean grain diameter of 0.1 to 1.2 mm is preferably used as the litter component.

The grained material can also contain small aggregates so that different types of materials with different colors, including granules of semi-precious stones, precious stones, mica, metal chips, plastic particles or glass particles can be incorporated into the surface or face concrete layer. The grained material can also be any rock mixture.

It has proven particularly practical for the method according to the invention if the litter component is or contains a rock mixture. This makes it possible to produce concrete elements that come very close to a natural stone look.

In the method according to the invention the litter component preferably contains at least material selected from the group of semi-precious stones, precious stones, mica, metal chips, glass and plastic particles. The use of these materials allows for a very economical method.

In the method according to the invention the grained material can in particular have a graded grain composition of no more than 2 mm grain diameter.

The surfaces and/or edges of the at least one green concrete element can be processed with brushes in the method according to the invention and thereby structured and/or roughened and/or smoothed and/or protrusions reduced at the edges. This can further enhance a decorative visual look.

Before, but preferably after compacting, an organic or inorganic agent, which is preferably colorless, can be applied to the surfaces of the concrete elements before or after the hardening. This is done to waterproof, seal or coat the concrete elements. In particular, a sealing and/or water-proofing agent can be applied to the surface of the at least one green concrete element. Such a procedure adds a further protective layer to the concrete elements, which increases the durability and service life of the concrete elements even more. This layer can also act as a stain protector and additionally prevent lime efflorescence.

The green concrete element is preferably hardened in the method according to the invention in order to obtain a concrete element. After having hardened, the concrete element is preferably processed by grinding, blasting, brushing and/or structuring the concrete element.

For further explanation, non-limiting examples are listed below.

EXAMPLES

Materials

Binder mixture: containing mainly latent hydraulic binders and pozzolanic binders.

Granular material: Aggregate with a through fraction of 72.5 wt. % at a screen hole width of 2 mm and a through fraction of 7.5 wt. % at a screen hole width of 0.25 mm.

Filler: Mixture of stone dust, fly ash and/or ground slag sand with a through fraction of 97 wt. % at a screen hole width of 0.025 mm and a through fraction of 63 wt. % at a screen hole width of 0.015 mm.

Alkaline hardener: 75% silica.

Pigment: Metal oxide pigment.

Additive: Setting retarder/setting accelerator.

Grained material: containing 80 wt. % of small aggregates with a mean grain diameter of 0.7 mm and 20 wt. % of inorganic binder.

The adhesive tensile strength is determined in accordance with the DAfSt guideline "Protection and repair of concrete components," Part 4, section 5.5.11. In deviation from this, a drilling depth of 50 mm is chosen.

Example 1

61 wt. % of granular material, 1.1 wt. % of pigment, 6.8 wt. % of filler, 4.4 wt. % of water, 22.3 wt. % of a binder mixture, 4.36 wt. % of an alkaline hardener, and 0.04 wt. % of an additive were consecutively added to a mixing container to obtain a composition, with the above data relating to the total weight of the composition. The composition was then mixed in the mixing container to obtain a mixture. The mixture thus obtained was poured as a face concrete layer in the form of a molding board in which raw concrete was already present. The face concrete layer had a basic color. The mixture was then compacted in the mold by stamping, whereby a green concrete element was obtained. Based on what was observed when the mold was removed, the green concrete element did not tear apart. After removal from the mold, the green concrete element had an adhesive tensile strength of more than 1.5 MPa (testing age 56 d). After having hardened, the concrete elements that were obtained were visually attractive. The concrete elements showed no discernible fading or any other deterioration in their decorative properties over a period of 6 months.

Example 2

67 wt. % of granular material, 1.1 wt. % of pigment, 4.4 wt. % of water, 23.1 wt. % of a binder mixture, 4.36 wt. % of alkaline hardener, and 0.04 wt. % of additive were consecutively added to a mixing container to obtain a composition, with the above information being based on the total weight of the composition. The composition was then mixed in the mixing container to obtain a mixture. The mixture thus obtained was poured as a face concrete layer in the form of a molding board in which raw concrete was already present. The face concrete layer had a basic color. The mixture was then compacted in the mold by stamping, whereby a green concrete element was obtained. Based on what was observed when the mold was removed, the green concrete element did not tear apart. After removal from the mold, the concrete element had an adhesive tensile strength of more than 1 MPa (testing age 56 d). After having hardened, the concrete elements that were obtained were visually attractive. The concrete elements showed no discernible fading or any other deterioration in their decorative properties over a period of 6 months.

Example 3

Example 3 is identical to Example 1 with the difference that a grained material was applied to the face concrete layer by means of a centrifugal disc before the stamping step. The plane of the centrifugal disc was oriented approximately parallel to the surface of the molding board at a distance from it. The application device was able to move across the mold board, so that all face concrete layers in the molds could be reached as desired. A funnel, into which the grained material was filled, was placed above the centrifugal disc. Any portion of the grained material could be directed onto the centrifugal disc by means of an opening and closing device that was arranged on the lower funnel opening. Basically, several funnels containing differently grained materials can be arranged above the centrifugal disc in order to be able to throw different grained materials at different dosages onto the surfaces of the face concrete layers. The speed of the centrifugal disc and its height relative to the molding board can also be adjusted and varied as required, even during the throwing movement, as can the speed of movement along the mold. Based on what was observed when the mold was removed, the green concrete element did not tear apart. After removal from the mold, the green concrete element had an adhesive tensile strength of more than 1.5 MPa. After having hardened, visually attractive concrete elements with a speckled surface were obtained. The concrete elements showed no discernible fading or any other deterioration in their decorative properties over a period of 6 months.

Example 4 (Comparative Example)

Example 4 is identical to Example 1 with the difference that the granular material has a through fraction of 100% at a screen hole width of 2.0 mm and a through fraction of 31.5% at a screen hole width of 0.25 mm.

The composition was then mixed in the mixing container to obtain a mixture. The mixture thus obtained was poured as a face concrete layer in the form of a molding board in which raw concrete was already present. The face concrete layer had a basic color. The mixture was then compacted in the mold by stamping, whereby a green concrete element was obtained. However, parts of the surface and/or the facing layer of the concrete elements tore off when the mold was removed, which resulted in damaged surfaces. These concrete elements could no longer be used. A determination of the adhesive tensile strength on undamaged parts of the concrete elements showed that the concrete elements had an adhesive tensile strength of significantly less than 1 MPa.

Example 5

Example 5 is identical to Example 1 with the difference that no additive (setting accelerator/setting retarder) was used.

The composition was then mixed in the mixing container to obtain a mixture. The mixture obtained in this way had a very short pot life, that is to say the period of time during which the mixture could still be filled from the mixing container into molds.

Example 6

63.5 wt. % of granular material, 1.1 wt. % of pigment, 4.01 wt. % of water, 27.2 wt. % of a binder mixture, 4.15 wt. % of alkaline hardener and 0.04 wt. % of an additive were successively added to a mixing container to obtain a composition, with the above information relating to the total weight of the composition. The composition was then mixed in the mixing container to obtain a mixture. The mixture thus obtained was poured as a face concrete layer in the form of a molding board in which raw concrete was already present. The face concrete layer had a basic color. The mixture was then compacted in the mold by stamping, whereby a green concrete element was obtained. Based on what was observed when the mold was removed, the green concrete element did not tear apart. After removal from the mold, the concrete element had an adhesive tensile strength of slightly less than 1 MPa (testing age 56 d).

The invention claimed is:

1. A concrete element comprising a core concrete layer and a face concrete layer, the face concrete layer being obtained by compacting and hardening a mixture containing:
   a latent hydraulic binder and/or a pozzolanic binder,
   water,
   a granular material, and
   3 wt. % to 5 wt. % of an alkaline hardener, based on the total weight of the mixture, with the granular material having,
   at a screen hole width of 2 mm, a through fraction from 35.5 wt. % to 99.5 wt. %, and
   at a screen hole width of 0.25 mm, a through fraction from 2.5 wt. % to 8.5 wt. %,
   each based on the total weight of the granular material, and
   wherein the alkaline hardener is selected from the group consisting of alkali metal oxides, alkali metal hydroxides, alkali metal carbonates, alkali metal silicates, alkali metal aluminates and mixtures thereof.

2. The concrete element according to claim 1, wherein the granular material has:
   at a screen hole width of 2 mm, a through fraction from 42.5 wt. % to 99.5 wt. %, and
   at a screen hole width of 0.25 mm, a through fraction from 2.5 wt. % to 8.5 wt. %,
   based on the total weight of the granular material.

3. The concrete element according to claim 1, wherein the granular material has a grain size number from 1.59 to 3.62.

4. The concrete element according to claim 1, wherein the mixture contains 55 wt. % to 80 wt. % of the granular material, based on the total weight of the mixture.

5. The concrete element according to claim 1, wherein the mixture contains 1 wt. % to 30 wt. % of a filler, based on the total weight of the mixture.

6. The concrete element according to claim 5, wherein the filler has, at a screen hole width of 0.025 mm, a through fraction from 63 wt. % to 99 wt. % and, at a screen hole width of 0.015 mm, a through fraction from 38 wt. % to 73 wt. %, based on the total weight of the filler.

7. The concrete element according to claim 5, wherein the filler is selected from the group consisting of fly ash, slag sand, rock powder, limestone powder, and mixtures thereof.

8. The concrete element according to claim 1, wherein the mixture contains 15 wt. % to 40 wt. % of latent hydraulic binder and/or pozzolanic binder, based on the total weight of the mixture.

9. The concrete element according to claim 1, wherein the latent hydraulic binder is selected from the group consisting of slag, blast furnace slag, electrothermal phosphorus slag, steel slag, and mixtures thereof and/or the molar ratio of $(CaO + MgO):SiO_2$ in the latent hydraulic binder ranges from 0.8 to 2.5.

10. The concrete element according to claim 1, wherein the pozzolanic binder is selected from the group consisting of amorphous silicon dioxide, precipitated silicon dioxide, pyrogenic silicon dioxide, microsilica, glass powder, fly ash, metakaolin, natural pozzolans, natural and synthetic zeolites, and mixtures thereof.

11. The concrete element according to claim 1, wherein the alkaline hardener is selected from the group consisting of alkali metal hydroxides, alkali metal silicates, and mixtures thereof.

12. The concrete element according to claim 1, wherein the mixture contains 3.15 wt. % to 4.85 wt. % of the alkaline hardener, based on the total weight of the mixture.

13. The concrete element according to claim 1, wherein the mixture contains 3 wt. % to 7 wt. % water, based on the total weight of the mixture.

14. The concrete element according to claim 1, wherein the mixture has hardening regulators.

15. The concrete element according to claim 1, wherein the mixture contains cement and/or one or more additives selected from the group consisting of gravel, grit, sand, perlite, kieselguhr, and vermiculite, and/or one or more additives selected from the group consisting of plasticizers, antifoam agents, water retention agents, dispersants, pigments, fibers, redispersible powders, wetting agents, impregnating agents, complexing agents, and rheology additives.

16. The concrete element according to claim 1, wherein the concrete element is a concrete block, a concrete slab, a concrete wall element, or a concrete step.

17. A method for producing the concrete element according to claim 1, comprising the following steps:
   a. preparing of a composition containing as components
      i. granular material,
      ii. optional pigment,
      iii. optional filler,
      iv. water,
      v. latent hydraulic binder and/or pozzolanic binder, and
      vi. alkaline hardener, wherein the alkaline hardener is selected from the group consisting of alkali metal oxides, alkali metal hydroxides, alkali metal carbonates, alkali metal silicates, alkali metal aluminates and mixtures thereof,
   b. mixing of the composition to obtain a mixture, that contains 3 wt. % to 5 wt. % of the alkaline hardener, based on the total weight of the mixture,
   c. filling of the mixture into at least one mold, and
   d. compacting of the mixture to obtain at least one green concrete element.

18. The method according to claim 17, wherein the components of the composition are metered in the order given.

19. The method according to claim 17, said method further comprising applying a grained material to the mixture before compacting said mixture in the at least one mold, the grained material comprising a litter component with a mean grain diameter of 0.1 to 5 mm in an amount of 65 to 95 wt. %, and a binder in an amount of 5 to 35 wt. %, based on the total composition of the grained material.

20. The method according to claim 17, wherein the surfaces and/or edges of the at least one green concrete element are processed with brushes and structured and/or roughened and/or smoothed and/or protrusions are reduced at the edges, and wherein a sealing and/or waterproofing agent is applied to the surface of the at least one green concrete element, and wherein the green concrete element is hardened to obtain a concrete element, wherein the concrete element is processed after it has hardened by grinding, blasting, brushing and/or structuring the concrete element.

21. The method according to claim 19, wherein the binder is an inorganic binder selected from the group consisting of cement, hydraulic lime, gypsum and water glass or the binder is an organic binder selected from the group consisting of plastic dispersions, acrylate resins, alkyd resins, epoxy resins, polyurethanes, SolGel resin and silicone resin emulsions, and/or said litter component has a mean grain diameter of 0.1 to 1.8 mm or from 1.2 to 5 mm, and/or said litter component comprises one or more of a rock mixture, semi-precious stones, mica, metal chips, glass and plastic particles.

22. The concrete element according to claim 19, wherein the binder contained in the grained material is in an amount of 5 to 35 wt. %, based on the total composition of the grained material.

23. The concrete element according to claim 1, wherein the granular material has, at a screen hole width of 2 mm, a through fraction from 72.5 wt. % to 97.5 wt. %, and, at a screen hole width of 0.25 mm, a through fraction 2.5 to 8.5 wt. %, based on the total weight of the granular material.

\* \* \* \* \*